United States Patent [19]

Stryjewski

[11] 4,098,631
[45] Jul. 4, 1978

[54] METHOD FOR MANUFACTURING A COMPLIANT ROLLER FOR USE IN AN ELECTROGRAPHIC APPARATUS

[75] Inventor: Walter Anthony Stryjewski, Rochester, N.Y.

[73] Assignee: Eastman Kodak Company, Rochester, N.Y.

[21] Appl. No.: 715,365

[22] Filed: Aug. 18, 1976

[51] Int. Cl.² .................. B29D 3/00; B29H 3/08
[52] U.S. Cl. .................. 156/221; 29/130; 29/132; 156/245; 156/294; 264/127; 264/230; 264/250; 264/262; 264/266; 264/267; 264/279; 264/322; 264/342 R; 264/328
[58] Field of Search .......... 264/347, 126, 230, 342 R, 264/271, 262, 250, 266, 254, 267, 269, 322, 279; 425/403; 29/130, 131, 132; 432/60, 2; 156/221, 86, 226, 227, 242, 245, 294

[56] References Cited

U.S. PATENT DOCUMENTS

| | | | |
|---|---|---|---|
| 1,678,042 | 7/1928 | Hansen | 264/347 |
| 1,798,210 | 3/1931 | Laursen | 264/347 |
| 1,902,573 | 3/1933 | Neidich | 264/230 |
| 2,689,192 | 9/1954 | Dolmetsch | 29/131 |
| 2,751,618 | 6/1956 | Pruitt | 29/131 |
| 3,417,176 | 12/1968 | Anderson et al. | 264/230 |
| 3,426,118 | 2/1969 | Chapman et al. | 264/230 |
| 3,426,119 | 2/1969 | Chapman et al. | 264/230 |
| 3,481,805 | 12/1969 | Holmes et al. | 264/342 R |
| 3,613,168 | 10/1971 | Rowland et al. | 425/403 |
| 3,883,293 | 5/1975 | McCarroll | 29/130 |
| 3,902,845 | 9/1975 | Murphy | 29/132 |
| 3,941,635 | 3/1976 | Tavelle et al. | 29/130 |
| 3,985,852 | 10/1976 | Evans | 264/230 |

FOREIGN PATENT DOCUMENTS 1,282,256  11/1968  Fed. Rep. of Germany ......... 29/131

OTHER PUBLICATIONS

Morton, Rubber Technology, Van Nostrand Reinhold, N.Y., (1974), pp. 401, 403, 404, 405.
Randolph et al., Plastics Engineering Handbook, Reinhold, N.Y. (1960), p. 109.

*Primary Examiner*—Willard E. Hoag
*Attorney, Agent, or Firm*—Warren W. Kurz

[57] ABSTRACT

A compliant roller for use in a xerographic fusing apparatus is made by placing a rigid gudgeoned roller core in a mold assembly with a preshrunk outer sleeve positioned about the interior surface of the mold and by forcing an elastomeric siloxane, e.g., silicone rubber, between the core and the sleeve. The sleeve is comprised of a material which contains tetrafluoroethylene and/or hexafluoropropylene copolymers. The ends of the roller are sealed with an epoxy resin and a forming fixture to form an oil tight and airtight seal.

10 Claims, 3 Drawing Figures

METHOD FOR MANUFACTURING A COMPLIANT ROLLER FOR USE IN AN ELECTROGRAPHIC APPARATUS

FIELD OF THE INVENTION

This invention relates to electrographic apparatus, and more particularly the invention relates to a method for making a compliant roller for use in affixing toner particles onto a support surface.

DESCRIPTION OF THE PRIOR ART

Prior art electrographic apparatus which make use of a roller assembly to fuse toner particles onto a support surface have utilized compliant rollers both as heated and as unheated back-up or pressure rollers. Various operative advantages evolve from the compliant roller structure, including a uniformity of pressure application and an extended heating nip.

However, several problems have been encountered in the use of such compliant rollers. These problems have been found to be primarily due to the manner in which the compliant roller is manufactured. An exemplary prior art manufacturing technique comprises preparing and grinding a rubber-covered roller core, applying a thick, uniform layer of adhesive around the rubber-covered core and thereafter positioning an outer, offset-preventing sleeve around the roll. The layer of adhesive serves both as a sealant for the outer sleeve and as a cushion for the finished roller. Finally the primed and etched outer sleeve is shrunk onto the rubber covered roll-core and the layer of adhesive material.

In this prior art method, the layer of adhesive must be thick enough to spread uniformly around the rubber-covered core, but not so thick as to cause lumps in the outer covering. If the adhesive layer is not uniformly applied around the surface of the roller-core, nonuniformities in the outer diameter of the roller will result. Also, air bubbles may become entrained in the adhesive layer between the roller core and its outer covering and cause the bond between the adhesive and the outer covering to fail prematurely. Since the outer covering is heat-shrunk onto the adhesive and rubber-covered core, tolerances of the outer covering must be closely maintained during the shrinking process to prevent any non-uniformities in the cover such as differential shrinkage, eccentricities and air bubbles. Also, if the ends of the outer sleeve are not securely held in place with an oil and air impervious seal, the sleeve can lift away from the core and the roller will begin to degrade by oxidation of the adhesive layer, offset oil migration to areas under the cover or further decomposition of the adhesive bond.

SUMMARY OF THE INVENTION

In view of the problems outlined above, there is a need in the art for a method for making a compliant roller with improved performance and minimum degradation during use. These and other objects and advantages are accomplished in accordance with the present invention by (1) preshrinking an outer roller sleeve, (2) placing the preshrunk sleeve around the inner surface of a mold assembly and a gudgeoned roller core which is also in the mold assembly, (3) forcing an elastomeric siloxane into the cavity between the roller core and the outer sleeve, and (4) sealing the ends of the sleeve.

BRIEF DESCRIPTION OF THE DRAWINGS

The objects, advantages and characteristic features of the subject invention will be even more apparent in the following detailed description of the invention in which reference will be made to the accompanying drawings wherein like reference numerals designate corresponding parts, and wherein.

DETAILED DESCRIPTION OF THE PREFERRED EMBODIMENT

Figure 1:
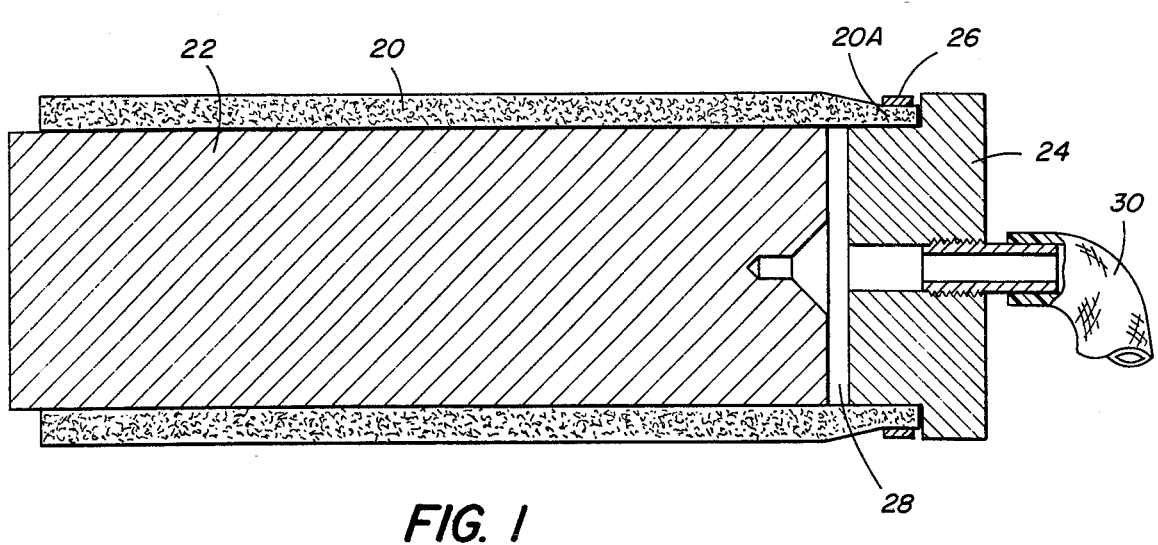
FIG. 1 is a partially schematic view of an outer sleeve mounted around a mandrel assembly to be shrunk in accordance with the invention.

FIG. 1 illustrates by way of example how an offset-preventing outer sleeve 20, e.g., polytetrafluoroethylene, is prepared for use in making a compliant roller in accordance with the present invention. Sleeve 20 is placed on a mandrel 22 which is of a diameter smaller than that of sleeve 20, and the sleeve and mandrel together are placed in a lathe where sleeve 20 is heated as it rotates about the lathe's horizontal axis until sleeve 20 has shrunk onto the mandrel. Sleeve 20 can then be removed from mandrel 22 by first inserting a plug 24 into one end 20A of sleeve 20 where the sleeve extends over the end of mandrel 22. A ring 26 clamps sleeve end 20A to plug 24, and air is pumped into space 28 through a conduit 30 so that a very thin layer of air is driven between sleeve 20 and mandrel 22, expanding the sleeve slightly and allowing sleeve 20 to be removed from mandrel 22 with relative ease.

Once sleeve 20 has been removed from mandrel 22, the sleeve will shrink to a diameter which is slightly smaller than was its diameter when it surrounded mandrel 22 in a shrunken condition. Sleeve 20 is treated with an elastomeric primer such as DC-4094 (Dow Corning Co.) on its etched interior surface and is then ready for insertion into a mold 32 (see FIG. 2).

By preparing sleeve 20 in accordance with the above-described method, uniform radial shrinkage of outer sleeve 20 is assured. This is due to sleeve 20 being preshrunk onto a rigid mandrel rather than being shrunk onto a relatively soft rubber-covered roller core. Therefore, the present roller does not present the problem of differential shrinkage along the sleeve which is common in the prior art compliant rollers whose outer sleeve is shrunk directly onto a rubber-covered roller core.

Figure 2:
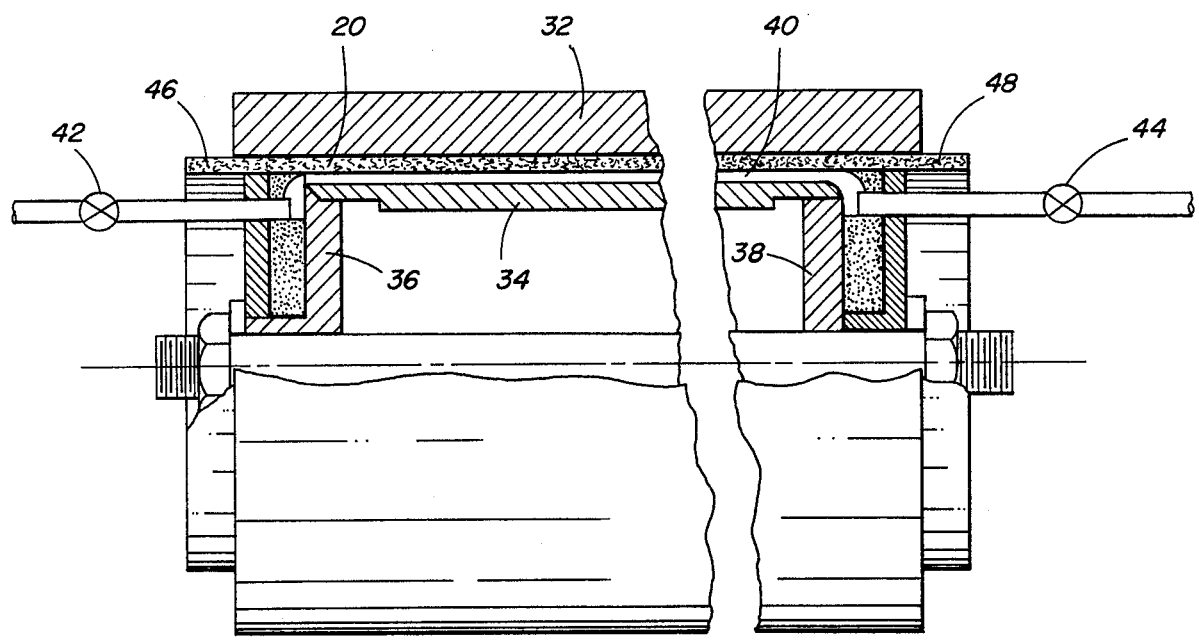
FIG. 2 is a partially schematic view of an outer sleeve and a gudgeoned roller core positioned in a mold assembly in accordance with one mode of the present invention.

FIG. 2 shows a mold assembly 32 which has a preshrunk sleeve 20 positioned about its inner surface. A rigid roller core 34 (here a metallic core) is mounted between a pair of gudgeons 36 and 38 such that it may be centered within mold assembly 32 about the inner surface of sleeve 20. A cavity 40, located between core 34 and sleeve 20, may be opened or closed by means of valves 42 and 44. An elastomeric siloxane such as silicone rubber is pumped into cavity 40 under pressures of between 5 to 500 p.s.i.g. to fill the cavity and gradually force sleeve 20 against the interior wall of mold 32 as cavity 40 becomes filled with the elastomeric siloxane. The amount of pressure under which the elastomeric siloxane is pumped into cavity 40 depends upon: (1) the thickness of the outer sleeve, (2) the residual stress within the outer sleeve, (3) the cross-sectional area of the cavity and (4) the diameter of the shrunken outer sleeve. That is, less pressure is required to pump the elastomeric siloxane into cavity 40 where the outer sleeve has been slightly shrunk and it only needs to be expanded slightly to completely fill the interior or mold 32 than where the outer sleeve has been shrunk to a diameter requiring a great deal of expansion to completely fill the interior of mold 32.

After the elastomeric siloxane has nearly filled cavity 40, the cavity is sealed under pressure by closing valve 42. Additional elastomeric siloxane is pumped into cavity 40 to assure full expansion of sleeve 20 against the mold walls. Valve 44 is then closed to maintain cavity pressure for a time (e.g., approximately 8 hours) sufficient to allow the elastomeric siloxane to set. The elastomeric siloxane can be caused to set in a much shorter period of time by heating the elastomeric siloxane to about 150° F, assuming of course that core 34 and the mold are able to withstand such a temperature. This heating of the elastomeric siloxane can be implemented by heating core 34.

Alternatively, core 34, together with sleeve 20 and the elastomeric siloxane, can be initially cured for a period (approximately 16 hours) at about 25° C before the sleeved roll is removed from mold 32. Once the roll is removed from mold 32, sleeve ends 46 and 48 are trimmed to a predetermined point such that the sleeve ends are allowed to extend past the two ends of core 34 to a length which will enable sleeve ends 46 and 48 to be subsequently tucked about the inner surface of the ends of core 34.

Figure 3:
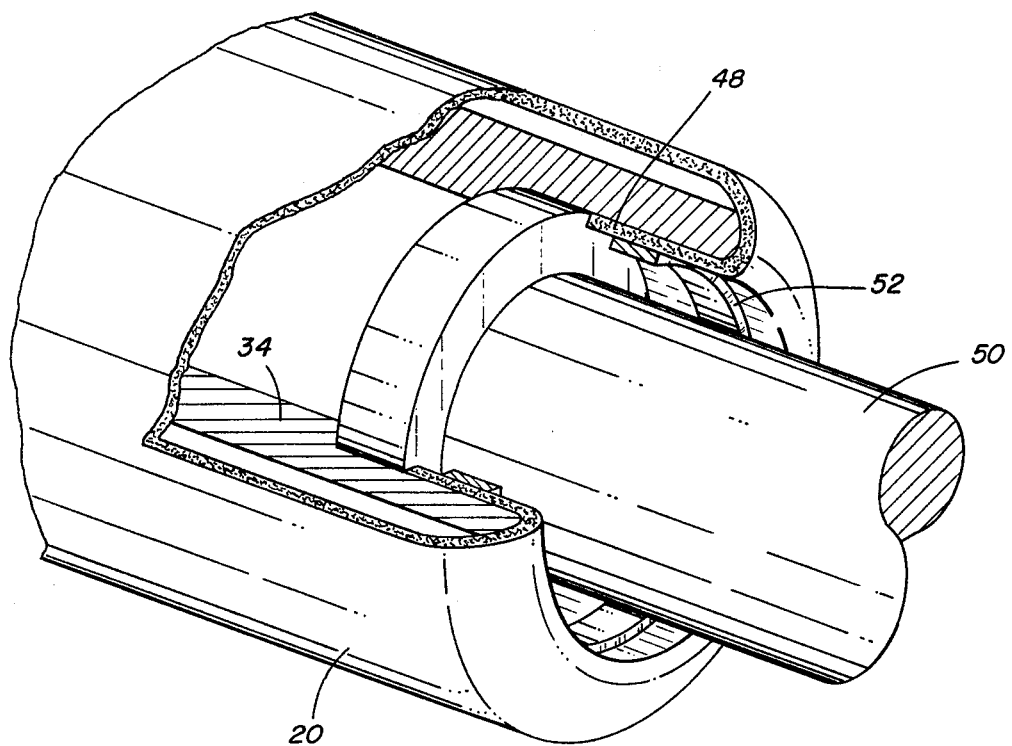
FIG. 3 is a fragmentary perspective view of one end portion of a roller and sleeve having a sealant fixture inserted in the end cavity of the roller.

FIG. 3 illlustrates how sleeve ends 46 and 48 are held securely in place. After gudgeons 36 and 38 (FIG. 2) are removed and stub axel 50 is placed in each end of roller core 34, the sleeve ends are heated to a temperature (e.g., 250° F or more) such that they are very soft and quite flexible. An epoxy resin adhesive (e.g., Emerson-Cuming Eccobond - 104) is applied to the inside of the ends of core 34 and then sleeve ends 46 and 48 are tucked, with the aid of a forming fixture, not shown, inside the ends of core 34 and into contact with the adhesive. A friction ring 52 is pressed into each end of core 34, urging sleeve ends 46 and 48 tightly against the epoxy coated roll core. The friction ring together with the epoxy resin now form an airtight and oil tight seal.

After the ends of the roll are securely sealed, the entire roll is completely cured in an oven and the roll is ready for use.

While the invention has been described in an embodiment which uses polytetrafluoroethylene as the outer sleeve for the compliant roller, any bondable sleeving material such as polyfluorinated tetrafluoroethylene and/or hexafluoropropylene copolymers is equally useful as the roller's outer sleeve. The invention has been described in an embodiment which makes use of Emerson-Cuming 4952 to fill the cavity between the roller core and the outer sleeve, however, other available elastomeric siloxane materials such as Emerson-Cuming 4966, General Electric RTV-700, General Electric RTV-60 and General Electric RTV-156 are equally as suitable for filling the cavity.

The invention has been described in detail with particular reference to certain preferred embodiments thereof but it will be understood that variations and modifications can be effected within the spirit and scope of the invention.

I claim:

1. A method for producing a compliant roller for use in an electrographic apparatus comprising the steps of:
   (a) disposing substantially the entire length of a shrinkable cylindrical sleeve about a cylindrical mandrel and shrinking said sleeve onto said mandrel, thereby forming a shrunken sleeve of uniform diameter;
   (b) removing said shrunken sleeve from the mandrel and placing the shrunken sleeve about an inner surface of a mold defining a mold cavity;
   (c) centering a rigid roller core in said mold cavity in spaced relation to the interior of said shrunken sleeve, said core having an outer diameter such that a cavity is provided between said core and said shrunken sleeve;
   (d) filling said cavity between said core and said shrunken sleeve with an elastomer material, thereby expanding said shrunken sleeve against said mold defining said cavity; and
   (e) hardening said elastomer material, thereby forming said roller.

2. The method of claim 1 wherein said sleeve comprises a copolymer of hexafluoropropylene.

3. The method of claim 1 wherein said sleeve comprises a copolymer of tetrafluoroethylene.

4. The method of claim 1 further comprising the step of sealing the ends of the compliant roller by:
   (a) applying a resinous adhesive around the inside of the ends of said rigid core;
   (b) heating the end portions of said outer sleeve;
   (c) tucking the end portions of said sleeve inside said core; and
   (d) securely urging the end portions of said sleeve against the adhesive and said core.

5. The method of claim 1 wherein said elastomer is introduced into said cavity under a pressure such that said sleeve is gradually expanded and forced firmly against the inner surface of said mold as said elastomer is introduced into said cavity.

6. The method of claim 5 wherein a pressure is applied to and maintained on said elastomer for a period, after said sleeve has been expanded firmly against said mold inner surface, sufficient to allow said elastomer to set.

7. The method of claim 1 wherein said elastomer is an elastomeric siloxane.

8. The method of claim 7 wherein said elastomeric siloxane is heated to a temperature sufficient to cause said elastomeric siloxane to set.

9. The method of claim 7 wherein said roller core is heated to a temperature sufficient to heat said elastomeric siloxane surrounding said core to a temperature sufficient to cause said elastomeric siloxane to set.

10. A method for producing a compliant roller for use in an electrographic apparatus comprising the steps of:
   (a) placing a preshrunk sleeve about the inner surface of a mold assembly;
   (b) centering a rigid roller core in said mold assembly in spaced relation to the interior of said sleeve, said core having opposing ends and an outer diameter such that a cavity is provided between said core and said sleeve; and
   (c) filling said cavity between said core and said sleeve with an elastomer material;
   (d) applying a resinous adhesive around the inside of the ends of said rigid core;
   (e) heating the end portions of said sleeve;
   (f) using a forming fixture is tuck the end portions of said sleeve inside said core; and
   (g) inserting a friction ring inside the ends of said core to securely urge the end portions of said sleeve against the adhesive and said core.

* * * * *